United States Patent
Myers et al.

(10) Patent No.: US 10,346,603 B2
(45) Date of Patent: Jul. 9, 2019

(54) METHOD, APPARATUS AND SYSTEM FOR GESTURE BASED SECURITY

(71) Applicant: SIERRA WIRELESS, INC., Richmond (CA)

(72) Inventors: Markus Myers, Richmond (CA); Philippe Frederic Joel Rene Guillemette, Vancouver (CA)

(73) Assignee: SIERRA WIRELESS, INC., British Columbia (CA)

( * ) Notice: Subject to any disclaimer, the term of this patent is extended or adjusted under 35 U.S.C. 154(b) by 742 days.

(21) Appl. No.: 14/559,035

(22) Filed: Dec. 3, 2014

(65) Prior Publication Data

US 2016/0162676 A1    Jun. 9, 2016

(51) Int. Cl.
*G06F 21/35*     (2013.01)
*G06Q 20/36*     (2012.01)
(Continued)

(52) U.S. Cl.
CPC ............ *G06F 21/35* (2013.01); *G06F 21/32* (2013.01); *G06Q 20/3278* (2013.01);
(Continued)

(58) Field of Classification Search
CPC ......... G06F 21/35; G06F 21/32; G06Q 20/40; G06Q 20/3278; G06Q 20/34; G06Q 20/3674
See application file for complete search history.

(56) References Cited

U.S. PATENT DOCUMENTS 8,232,879 B2    7/2012    Davis
8,427,320 B2    4/2013    Davis
(Continued)

FOREIGN PATENT DOCUMENTS

DE    10248389 A1 *    8/2004    ............ G06K 19/07

OTHER PUBLICATIONS

International Organization for Standardization, ISO/IEC 14443-1:2008, "Identification Cards—Contactless integrated circuit cards—Proximity cards—Part 1: Physical characteristics," http://www.iso.org/iso/iso_catalogue/catalogue_ics/catalogue_detail_ics.htm?csnumber=39693, Jul. 22, 2016, Abstract only.
(Continued)

*Primary Examiner* — Joseph P Hirl
*Assistant Examiner* — J. Brant Murphy
(74) *Attorney, Agent, or Firm* — Cooley LLP (57) ABSTRACT

A method, system, token and scanning device for gesture-based security are provided. The token includes an information storage module such as an RFID system or a microchip system of a contactless smart card, and a fiducial marker of the token, such as a unique optically recognizable pattern. The token scanning device includes a detection module configured for retrieving details from the information storage module, a motion tracking module for tracking a trajectory of the fiducial marker relative to the scanning device, and an authentication module for authenticating the token if the tracked trajectory matches sufficiently to a reference trajectory associated with the token. A user can authenticate a usage of the token such as a financial transaction by gesture-based motion of the token to match the reference trajectory.

22 Claims, 6 Drawing Sheets

(51) Int. Cl.
*G06F 21/32* (2013.01)
*G06Q 20/32* (2012.01)
*G06Q 20/34* (2012.01)
*G06Q 20/40* (2012.01)

(52) U.S. Cl.
CPC ......... *G06Q 20/34* (2013.01); *G06Q 20/3674* (2013.01); *G06Q 20/40* (2013.01)

(56) References Cited

U.S. PATENT DOCUMENTS

| | | | | |
|---|---|---|---|---|
| 2010/0033299 A1* | 2/2010 | Davis | ................... | G06F 1/1626 340/5.1 |
| 2010/0093428 A1* | 4/2010 | Mattice | ............... | G07F 17/3239 463/25 |
| 2011/0267174 A1* | 11/2011 | Davis | ................... | G06F 1/1626 340/10.1 |
| 2013/0234836 A1* | 9/2013 | Davis | ............... | G06K 19/07336 340/10.5 |
| 2014/0118147 A1* | 5/2014 | Davis | ............... | G06K 19/07336 340/572.1 |
| 2014/0126767 A1* | 5/2014 | Daon | ................. | G06K 9/00624 382/103 |
| 2014/0195425 A1* | 7/2014 | Campos | ................. | G06Q 20/20 705/41 |

OTHER PUBLICATIONS

International Organization for Standardization, ISO/IEC 14443-2:2010, "Identification Cards—Contactless integrated circuit cards—Proximity cards—Part 2: Radio frequency power and signal interface," http://www.iso.org/iso/home/store/catalogue_tc/catalogue_detail.htm?csnumber=50941, Jul. 22, 2016, Abstract only.

International Organization for Standardization, ISO/IEC 14443-3:2011, "Identification Cards—Contactless integrated circuit cards—Proximity cards—Part 3: Initialization and anticollision," http://www.iso.org/iso/store/catalogue_tc/catalogue_detail.htm?csnumber=50942, Jul. 22, 2016, Abstract only.

International Organization for Standardization, ISO/IEC 14443-4:2008, "Identification Cards—Contactless integrated circuit cards—Proximity cards—Part 4: Transmission protocol," http://www.iso.org/iso/iso_catalogue/catalogue_tc/catalogue_detail.htm?csnumber=50648, Jul. 22, 2016, Abstract only.

International Organization for Standardization, ISO/IEC 15693-1:2010 "Identification Cards—Contactless integrated circuit cards—Vicinity cards—Part 1: Physical characteristics," http://www.iso.org/iso/iso_catalogue/catalogue_ics/catalogue_detail_ics.htm?csnumber=39694, Jul. 22, 2016, Abstract only.

International Organization for Standardization, ISO/IEC 15693-2:2006, "Identification Cards—Contactless integrated circuit cards—Vicinity cards—Part 2: Air interface and initialization," http://www.iso.org/iso/iso_catalogue/catalogue_tc/catalogue_detail.htm?csnumber=39695, Jul. 22, 2016, Abstract only.

International Organization for Standardization, ISO/IEC 15693-3:2009, "Identification Cards—Contactless integrated circuit cards—Vicinity cards—Part 3: Anticollision and transmission protocol," http://www.iso.org/iso/iso_catalogue/catalogue_tc/catalogue_detail.htm?csnumber=43467, Jul. 22, 2016, Abstract only.

\* cited by examiner

Contactlessly Interact With Token to:

Detect Presence of Information Storage Module of Token;

Scan Information Storage Module to Obtain Data.

220

Track Trajectory of Fiducial Marker of Token.

230

Authenticate Token if Tracked Trajectory Matches Reference Trajectory Associated with Token

METHOD, APPARATUS AND SYSTEM FOR GESTURE BASED SECURITY

FIELD OF THE TECHNOLOGY

The present technology pertains to the field of security and in particular to a method, apparatus and system for gesture based security.

BACKGROUND

Payment systems including contactless technology, such as contactless smart cards and fobs, are currently increasing in popularity. In such systems, a customer only has to wave their smart card or fob over a reader to authorize payment to a merchant. The customer is typically not required to enter a security code such as a Personal Identification Number (PIN) to complete the transaction in this mode. This lack of authentication represents a significant security issue, which is typically dealt with by limiting the applicability of this mode to transactions which are less than a limited amount, typically less than $100. On the other hand, it is recognized that the feature of not having to enter a PIN or touch a keypad is convenient for at least the customer.

U.S. Pat. No. 8,232,879 discloses an RFID device that includes a motion sensing mechanism. The motion sensing mechanism is used to control access to data on the RFID device to only instances when the holder of the device moves it in a predefined sequence of motions. However, as the motion sensing mechanism is incorporated into the RFID device, the device is required to be significantly complex and expensive.

Therefore there is a need for a method, apparatus and system for providing gesture based security, for example for use in contactless payment and other systems, that is not subject to one or more limitations of the prior art.

This background information is provided to reveal information believed by the applicant to be of possible relevance to the present technology. No admission is necessarily intended, nor should be construed, that any of the preceding information constitutes prior art against the present technology.

SUMMARY

An object of the present invention is to provide a method, apparatus and system for gesture based security. In accordance with an aspect of the present invention, there is provided a system for gesture-based security, the system comprising: a token including: an information storage module; and a fiducial marker on the token, for example formed on the token; and a token scanning device including: a detection module configured for contactless interaction with the token to detect presence of the information storage module and to scan the information storage module to obtain data therefrom; a motion tracking module configured to track a trajectory of the fiducial marker relative to the scanning device; and an authentication module operatively coupled to the detection module and the motion tracking module, the authentication module configured to authenticate the token if the tracked trajectory matches sufficiently to a reference trajectory associated with the token.

In accordance with another aspect of the present invention, there is provided a token for use with a contactless system, the token comprising: an information storage module configured to convey data to a token scanning device of the contactless system when scanned thereby, the data stored by or inherent to the information storage module; and a fiducial marker of the token, the fiducial marker configured for recognition by a motion tracking module remote to the token and associated with the contactless system, the fiducial marker further configured to indicate a trajectory of positions, orientations, or both, said trajectory being discernible by the motion tracking module.

In accordance with another aspect of the present invention, there is provided a device for use in scanning a token associated with a contactless system, the device comprising: a detection module configured for contactless interaction with said token to detect presence of an information storage module included in said token and to scan the information storage module to obtain data therefrom; a motion tracking module configured to track a trajectory of a fiducial marker of said token, said trajectory being relative to the motion tracking module; and an authentication module operatively coupled to the detection module and the motion tracking module, the authentication module configured to authenticate said token if the tracked trajectory matches sufficiently to a reference trajectory associated with the token.

In accordance with another aspect of the present invention, there is provided a method for gesture-based security associated with a token of a contactless system, comprising: contactlessly interacting with said token to detect presence of an information storage module included in said token and to scan the information storage module to obtain data therefrom; tracking a trajectory of a fiducial marker of said token, said trajectory being relative to the motion tracking module; and authenticating said token if the tracked trajectory matches sufficiently to a reference trajectory associated with the token.

DETAILED DESCRIPTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology provides solutions for gesture-based security for use with contactless technologies such as technologies relating to contactless smart cards, cards incorporating RFID cards, or other technologies for conveying information at a limited distance, such as inductive field communication, Optical RFID (OPID) systems, RuBee systems, optical barcode readers, or the like. The contactless technology may be used in a contactless payment system or for another application such as access control, identification, tracking, or the like.

The gesture-based operations as described herein may be used to provide an authentication mechanism which may or may not be used in conjunction with other authentication mechanisms. Briefly, the token incorporating the contactless technology further incorporates one or more fiducial markers which can be recognized and tracked by a motion tracking system which is remote to the token, for example incorporated into a payment terminal. The motion tracking system may be an optical system such as a camera, and the fiducial markers may comprise optically recognizable markings formed on the card surface. The token may be a card such as a plastic credit card or other wallet-sized card. Alternatively, the token may be another hand-held item such as a fob. In various embodiments, other than the incorporated contactless technology, which may include a microchip, inductive coupling element, antenna, and the like, the token is relatively simple, including a plastic housing having markings thereon. The token may thus be free of motion sensors, lights, or other relatively complex and costly elements.

To invoke the authentication mechanism, a user holding the token is instructed to manually move the token through a predetermined trajectory, such that the fiducial markers generally remain within a field of view of the motion tracking system. This input trajectory, also referred to as the gesture being input by the user, is intended to match a reference trajectory (reference gesture) associated with the token and generally intended to be treated as an authentication "secret" known to the token user, much like a PIN. The motion tracking system records the trajectory and compares it to the reference trajectory, which may, in various embodiments, be retrieved from a database based on a token identifier previously retrieved from the token via the contactless technology. In other embodiments, the reference trajectory may be stored on the token itself and retrieved via the contactless technology. If the recorded trajectory sufficiently matches the reference trajectory (allowing for a predetermined amount of variation in time and space), then a current operation or transaction involving the token is authenticated. Otherwise, the authentication fails and the operation or transaction may potentially be denied.

Figure 1:
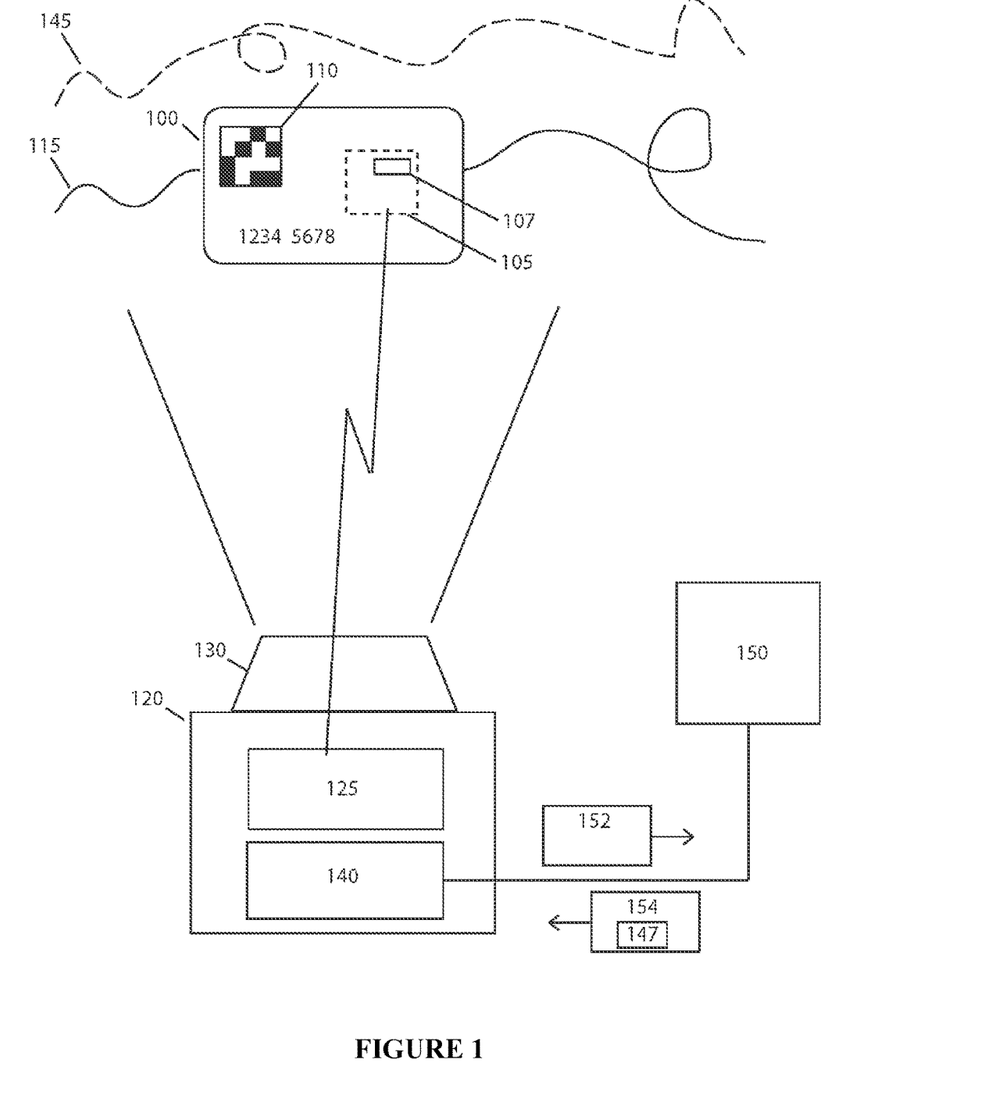
FIG. 1 illustrates a system for gesture-based security provided in accordance with embodiments of the invention.

In accordance with some embodiments of the present invention, a system for gesture-based security is provided, an example of which is illustrated in FIG. 1. The system includes a token such as a card 100 and a token scanning device such as a card scanner 120 of a Point of Sale (POS) terminal. The token includes both an information storage module and a fiducial marker. The information storage module may be a microchip 105 of a "smart card" for example, while the fiducial marker may be a set of optically recognizable markings 110. The token scanning device includes a detection module 125 configured for contactless interaction with the token to detect presence of the information storage module, and further configured to scan the information storage module to obtain data therefrom. As illustrated, the data includes an identifier 107 stored in the information storage module. The token scanning device further includes a motion tracking module 130 configured to track a trajectory 115 of the fiducial marker relative to the scanning device. The token scanning device further includes an authentication module 140 operatively coupled to the detection module and the motion tracking module. The authentication module is configured to authenticate the token if the tracked trajectory 115 matches sufficiently to a reference trajectory 145 associated with the token. The reference trajectory may be associated with the token via the obtained data which is obtained from the token. For example, the reference trajectory may be encoded in the obtained data or the obtained data may include a value which is associated with the reference trajectory in an external database, and which can be used to retrieve the reference trajectory data from the external database via a database query. As illustrated, data 147 describing the reference trajectory 145 is retrieved from a remote database 150 via a query response 154 which is generated in response to a query 152. The query specifies the identifier 107 as a lookup parameter designed to return the data 147, since the identifier 107 and the data 147 are associated in the table.

In accordance with other embodiments of the present invention, there is provided a token for use with a contactless system providing gesture-based security, such a token being generally as described in the system above. In accordance with still other embodiments of the present technology, there is provided a token scanning device for use with a contactless system providing gesture-based security, such a token scanning device being generally as described in the system above.

Figure 2A:
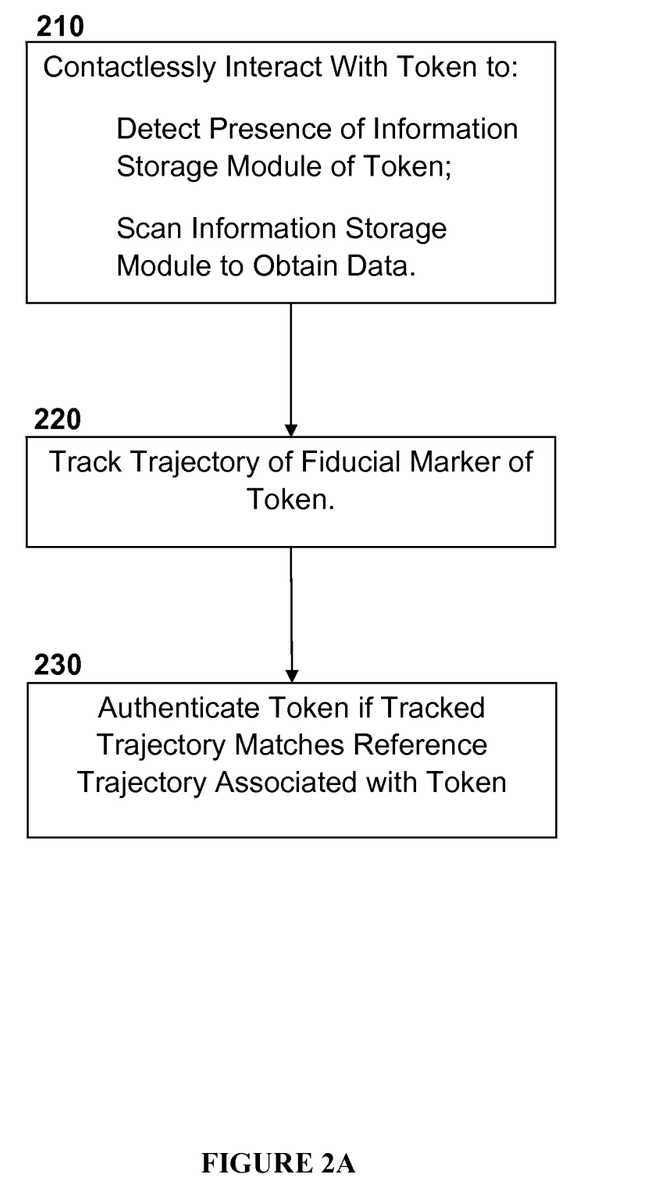
FIGS. 2A and 2B illustrate methods for gesture-based security provided in accordance with embodiments of the invention.

In accordance with still other embodiments of the present invention, there is provided a method, such as a computer-implemented method, for gesture-based security and/or an associated computer program product, both of which correspond to various operations of the system as described above. As illustrated in FIG. 2A, a method provided in accordance with some embodiments comprises contactlessly interacting 210 with said token to detect presence of an information storage module included in said token and to scan the information storage module to obtain data therefrom; tracking 220 a trajectory of a fiducial marker of said token, said trajectory being relative to the motion tracking module; and authenticating 230 said token if the tracked trajectory matches sufficiently to a reference trajectory associated with the token. The reference trajectory may be associated with the token via the obtained data which is obtained from the token.

Figure 2B:
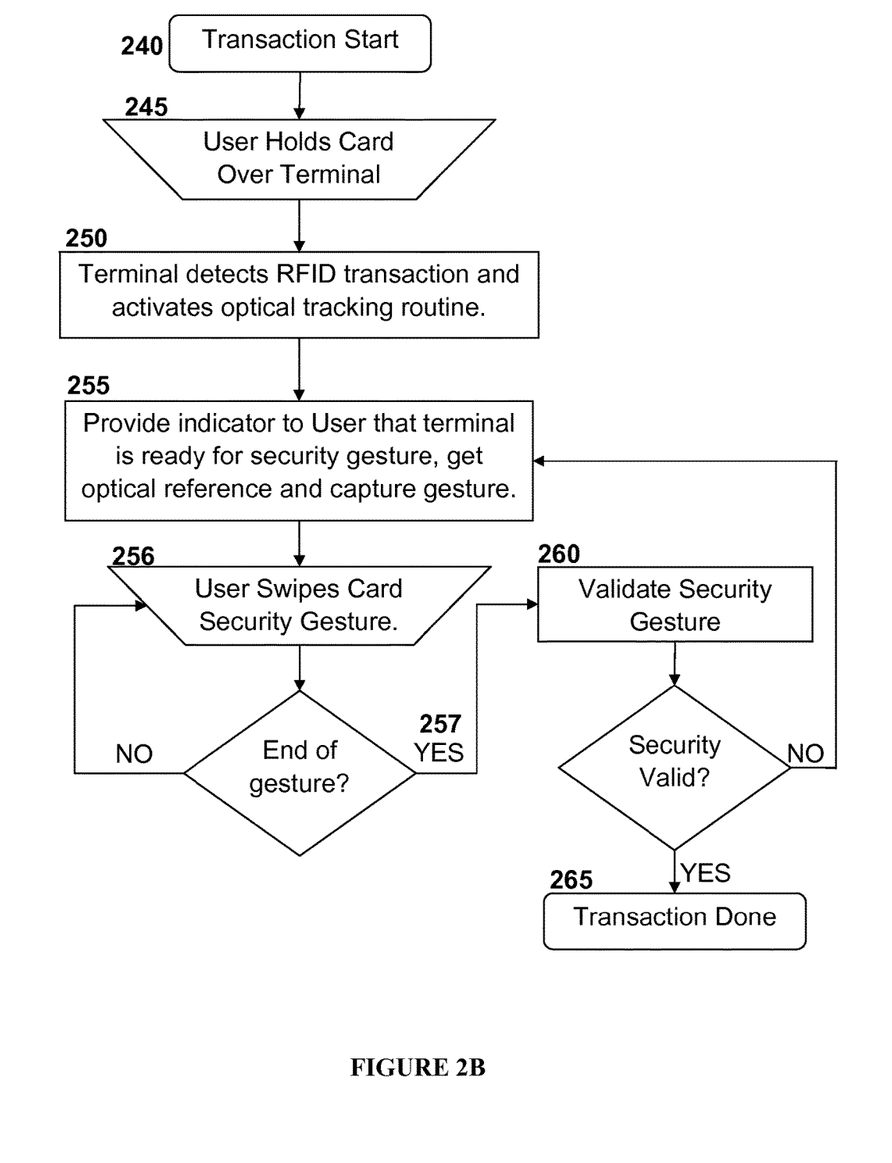

As illustrated in FIG. 2B, another method provided in accordance with some embodiments comprises, following the start 240 of a transaction, having 245 a user hold their card or other token over a terminal such as a POS terminal, and detecting 250 by the POS terminal an RFID transaction between the terminal and the card, and, in response activating an optical tracking routine in preparation for tracking motion of a fiducial marker on the card. Subsequently, an indicator is provided 255 to the user that the terminal is ready to receive the security gesture input from the user, obtain an optical reference and capture the gesture input. Subsequently, the user provides 256 the security gesture input by moving the card through a predetermined input trajectory. If the security gesture input is determined 257 to have ended (e.g. by an explicit gesture or by recognition that a complete and correct security gesture has been provided), then the gesture is analyzed for validation 260 and if valid the transaction is completed 265. Otherwise, the user may be provided with another opportunity to input the security gesture.

Contactless System

Embodiments of the present invention relate to a contactless system for providing automatic interaction between a token and a token reader. As mentioned above, the contactless system may correspond to one of a variety of technologies relating to contactless smart cards, cards incorporating RFID cards, or other technologies for conveying information at a limited distance, such as inductive field communication, Near Field Communication (NFC), Optical RFID (OFID) systems, RuBee systems, optical barcode readers, or the like.

The contactless system comprises an information storage module aboard the token. As an example, the information storage module may be associated with the microchip of a contactless smart card or electronic components of an RFID tag.

As it is generally desirable to limit the cost of tokens, information storage modules which include an electronic component may comprise passive technology or energy-harvesting components, rather than batteries. Electronic information storage modules may comprise an electronically readable and writable memory, a microprocessor optionally configured to impose security measures such as encryption, and the like. The standards "ISO/IEC 14443 Identification cards-Contactless integrated circuit(s) cards-Proximity cards" and ISO/IEC 15693 Identification cards-Contactless integrated circuit(s) cards-Vicinity cards," published and maintained by the International Organization for Standardization, may be applicable to various electronic information storage modules.

The contactless system further comprises a detection module aboard the token scanning device. The detection module is configured both to detect the presence of an information storage module within a predetermined distance, and to scan the information storage module to obtain data therefrom. The detection module may be a contactless smart card reader associated with a POS terminal or other terminal, an RFID tag reader, an optical scanner, or the like.

Operation of the contactless system generally comprises presenting the token within a predetermined distance of the detection module. The distance is greater than contact distance and may be up to a predetermined distance such as a few centimeters up to a few hundred centimeters or more, depending on the underlying technology being used. The detection module then detects the presence of the token and retrieves information from the token either by detecting passive physical characteristics of the token or by active interaction with a microprocessor embedded within the token. The information is transmitted from the token to the detection module via a contact-free means such as via electromagnetic radiofrequency or optical interaction.

Elements of contactless systems used in accordance with various embodiments of the present technology may operate as would be readily understood by a worker skilled in the art and are therefore not described in full detail herein. This includes elements such as electronic memories, microprocessors, Near Field Communication, Inductive energy harvesting, radiofrequency and/or optical communication, and the like. For example, the detection and reading of contactless smart cards, RFID tags and the like is well documented in various industry publications and technical specifications.

In some embodiments, the contactless system is associated with a financial product such as a credit card, debit card, stored-value card, or the like. In other embodiments, the contactless system may be associated with an access card or an identity card of a security system, or another application.

Fiducial Marker

Embodiments of the present invention relate to a fiducial marker of the token, for example as visible markings on a card or fob. The fiducial marker may comprise one or more readily recognizable and predetermined patterns of a predetermined size. The fiducial marker is generally configured to be discernible by a detector such as a camera, and recognizable as a known fiducial marker by an associated processing system such as an image processor.

In some embodiments, the fiducial marker is configured for suitably high-contrast visibility (within a predetermined spectral range) against a background, for example by use of dark ink on a light background or vice-versa, or by using a light reflective, fluorescent or phosphorescent medium to form the fiducial marker. In some embodiments, when a power supply is available in the token, the fiducial markers may comprise active elements such as LEDs.

In some embodiments, the fiducial marker is formed by embedding elements within the token or surface mounted onto the token or printed on the token or screened on the token or a combination thereof.

In some embodiments, a card such as a wallet-sized card may be used since it provides ample surface area for inclusion of the fiducial marker. Notably, by separating elements of the fiducial marker by a relatively wide space, greater resolution in discerning rotations and orientations of the marker may be achieved. A larger fiducial marker or a fiducial marker spread over a larger area may also facilitate ease of detection of the fiducial marker.

For example, in some embodiments, the fiducial marker comprises components located at opposite edges or corners of a planar surface of the token, whether a card or other type of token. For example, a card may include fiducial marker elements in all four corners. Although one of these elements may potentially be covered by a user's finger, the other three elements may still be visible. Further, the user may be instructed to consistently cover the same element as part of the user's signature, and authentication may comprise confirming that the correct marker is being covered by the user.

In various embodiments, the size and/or separation of certain features of the fiducial marker is predetermined and known to the motion tracking module. For example, the fiducial marker may include two or more marks such as "dots" separated by a predetermined distance. By measuring the angular distance or apparent separation of these marks at the motion tracking module, the distance to the fiducial marker can be determined for example using trigonometry.

In various embodiments, the shape of certain features of the fiducial marker is substantially asymmetric under rotations about axes perpendicular to the plane of the fiducial marker. Thus, the angular orientation about such an axis (e.g. an axis projecting outward from a plane of a card carrying the fiducial marker) can be readily discernible. For example, the fiducial marker features may form a non-equilateral triangle such as an isosceles triangle, or the vertices of such a triangle. Other features or sets of two or more distinct features may also be employed.

In one embodiment, the fiducial marker comprises components on differently oriented surfaces of the token, for example on both front and back of a card, on different sides of a cube, on different parts of a ball, or the like. The trajectory may comprise exposing different parts of the fiducial marker to the motion tracking module at different times, for example by flipping the card or rotating the token in a predetermined manner. The motion tracking module may be configured to detect changes in which parts of the fiducial marker is exposed, thereby tracking how the token is being rotated as part of the trajectory.

In various embodiments, the shape of certain features of the fiducial marker is configured to distort in appearance (as seen from a given viewpoint) when rotated about one or more axes passing through a plane in which the fiducial marker lies. For example, when a fiducial marker with known vertical height is rotated about an axis passing horizontally through the fiducial marker plane, the apparent vertical height will change as the image appears to vertically stretch or compress. By measuring the amount of distortion, an amount of rotation about such axes may be determined.

Figure 3:
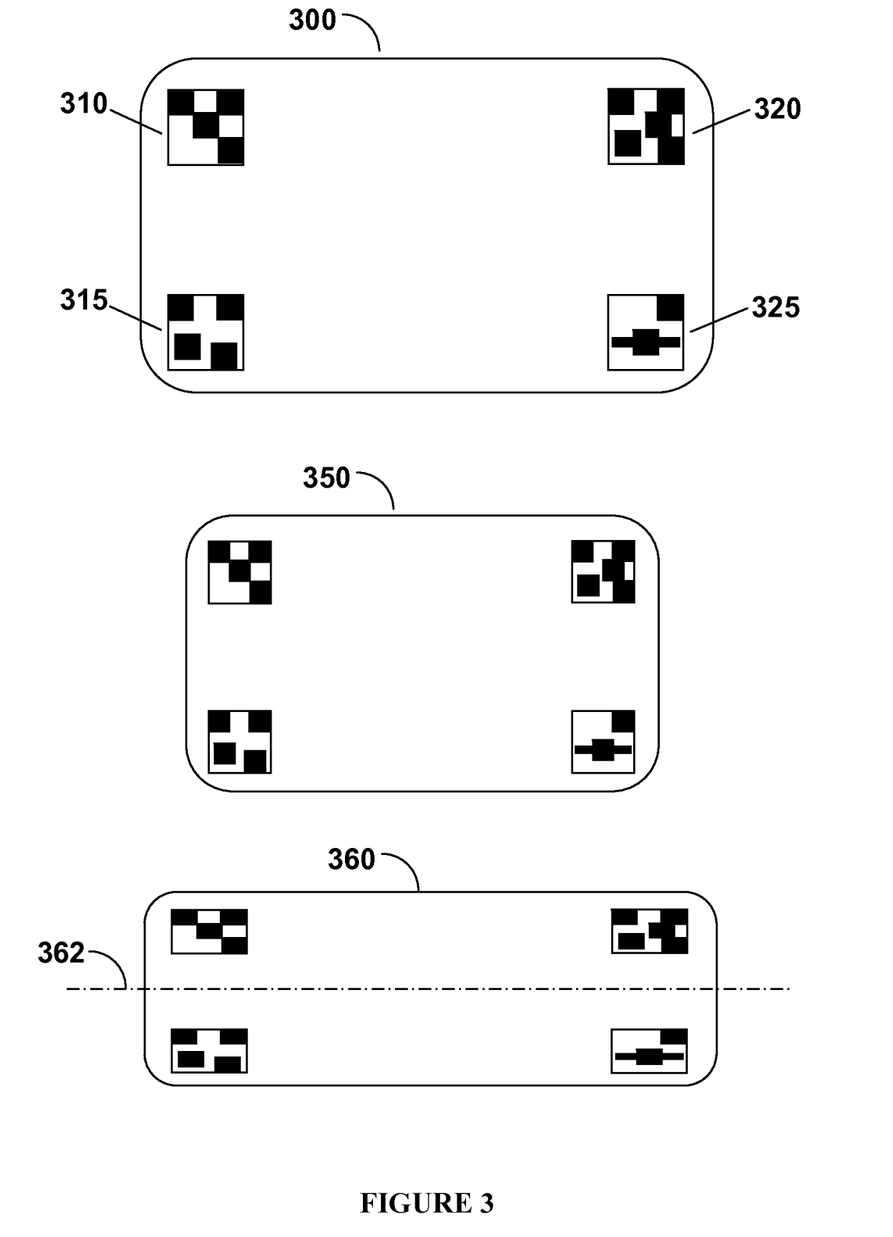
FIG. 3 illustrates a card incorporating a fiducial marker in accordance with an embodiment of the present invention.

FIG. 3 illustrates an example of a card 300 incorporating a fiducial marker embodying the above features, in accordance with an embodiment of the present technology. The fiducial marker in the present example is broken into four components 310, 315, 320, 325 arranged at respective corners of the card 300. The separation of these components may facilitate improved tracking resolution and/or mitigate the potential for all components to be obscured by a user's hand. Further, the fiducial marker may be readily recognizable even if some of the components are obscured. The fiducial marker may comprise fewer or smaller components than illustrated. In some embodiments the fiducial marker may be integrated with other visual elements of the card and difficult to observe from casual observation, although readily recognizable by the motion tracking module. Each component 310, 315, 320, 325 of the fiducial marker comprises an optically recognizable pattern which is substantially unique, thereby identifying the fiducial marker as being of a type applicable to the present technology. The size of the components 310, 315, 320, 325 and the distance between them is also predetermined and known. This assists the motion tracking module in discerning distance and/or rotations of the fiducial marker by measuring angular distance or apparent separation in both the horizontal and vertical directions. For example, when the card is moved away from an optical detector of the motion tracking module, its apparent size is reduced 350 which correspondingly reduces the apparent separation between the all of the components 310, 315, 320, 325 while also maintaining their apparent relative positions. When the card is rotated 360 about an axis 362, the apparent separation between components 310 and 315 and between components 320 and 325 reduces, while the apparent separation between components 310 and 320 and between components 315 and 325 remains the same. The apparent height of the components also reduces. Various apparent positions of the components 310, 315, 320, 325 relative to each other and/or relative to a reference frame may be correlated to different spatial and/or rotational positions of the fiducial marker, as would be readily understood by a worker skilled in the art.

The card 300 further comprises an internal contactless information storage module 330 such as a contactless smart card system incorporating an antenna, microprocessor, memory, inductive energy harvesting system, and the like.

Although optically detectable fiducial markers are described primarily herein, it is recognized that other types of markers may be used, subject to availability of a detector for detecting position and/or orientation of same with sufficient precision. Suitable types of markers may correspond to capacitors used for modulating an electric field, inductors used for modulating a magnetic field, antennas used for modulating an electromagnetic field, electrical conductors used for modulating such fields, or the like, or a combination thereof.

For example, a fiducial marker may comprise a loop antenna incorporated into the token. As the token is rotated within an electromagnetic field generated and monitored by the detection module or the motion tracking module depending on which device is capable of tracking changes in the electromagnetic field, the antenna may manipulate said field thereby indicating the trajectory which may correspond to a pattern of rotations of the token. For example, the pattern of rotations may be interpreted as a binary signal.

In some embodiments, the information storage module of the token is also used as part or all of the fiducial marker. For example, an RFID tag, wireless energy harvesting inductor, RF antenna, or other component associated with the information storage module may interact with the electromagnetic field of the detection module of the token scanning device in a different manner according to the position and/or orientation of same within the scanning device's electromagnetic field. For example, using triangulation, position of the token may be at least partially discerned via tracking of such field disturbances. The detection module may be integrated with the motion tracking module for this purpose.

In some embodiments, the NFC signal strength of the information storage module may be used as a proxy for distance between the token and the motion tracking module/detection module. As the signal strength increases or decreases, the token may be determined to be closer or further, respectively, from the motion tracking module/detection module.

In embodiments where the information storage module is an optically readable element such as a barcode or OPID tag, this element may also be treated as all or part of an optical fiducial marker.

Motion Tracking Module

As set forth above, embodiments of the present invention comprise a motion tracking module configured to track a trajectory of the fiducial marker relative to the scanning device.

In various embodiments, the motion tracking module can be characterized as a computer vision system configured to perform video tracking possibly as well as event detection, object recognition, motion estimation, and the like. Such a motion tracking system may comprise one or more video cameras (or still cameras configured to produce a succession of images at an adequately high rate) configured to produce digital images along with a computer system configured to process the digital camera images. The motion tracking module is generally configured to scan for and detect predetermined types of fiducial markers appearing in the camera images, and to track spatial motions corresponding to translation of the fiducial markers, distortions (such as changes in height or width or skewing of the fiducial marker) corresponding to certain rotations of the fiducial markers, and/or changes in apparent size of the fiducial markers (or changes in apparent separation of elements thereof) corresponding to translation of the fiducial markers toward or away from the camera. The motion tracking module may further be configured to detect fiducial markers even when they are distorted as described above, their apparent size changes, and/or when they appear at an arbitrary location and orientation within the camera field of view. The motion tracking module may employ various machine vision methods and/or computer algorithms to facilitate its operation.

The motion tracking module may be configured to generate an output corresponding to a digital representation of the trajectory of the fiducial marker as tracked through the field of view. For example, the output may represent a sequence of locations, in up to three-dimensional space, of the fiducial marker as well as rotations, about up to three axes, of the fiducial marker. The output may be provided in various forms, such as a set of numerical vectors.

The motion tracking module should generally be capable of adequate monitoring of a given field of view in order to discern input trajectories with a given amount of resolution and reliability. For example, a video camera which is capable of capturing images with an adequately high pixel resolution and at an adequately high frame rate in order to discern fiducial markers and trajectories thereof may be used. On the other hand, an optical detector of a barcode scanner which scans a spatial area in a raster pattern and at a low speed may be inadequate for discerning relatively fast-moving trajectories of a fiducial marker. Non-optical based motion tracking modules may be employed provided that capture speed and image resolution is adequately high.

Figure 4:
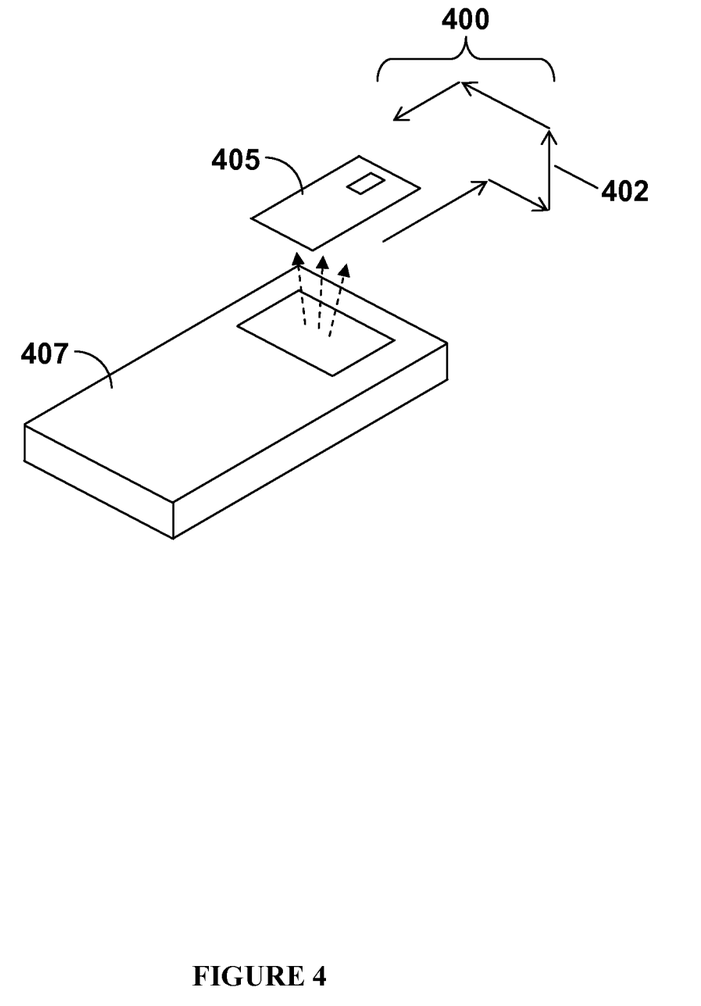
FIG. 4 illustrates an example of translational motion or gesture, in accordance with an embodiment of the present invention.

FIG. 4 illustrates an example translational motion 400 which may be used as part or all of a trajectory of a card 405 comprising fiducial markers relative to a motion tracking module 407. The translational motion 400 is illustrated in three spatial dimensions, however the trajectory may be characterized in fewer dimensions. For example, in some embodiments, the reference trajectory is two-dimensional although an adequately matching input trajectory can be reproduced by a two-dimensional input trajectory or a three-dimensional input trajectory whose projection onto an appropriate two-dimensional plane matches the reference trajectory. For example, the portion 402 of the overall motion 400 in which the card moves away from the motion tracking module may be ignored. The trajectory may be of limited complexity to facilitate ease of recall and reproduction by the user as well as signal processing and motion tracking. However, the trajectory should also be sufficiently complex that a large number of different trajectories are possible, to avoid an unauthorized user easily "guessing" the correct trajectory. In some embodiments, the reference trajectory may correspond to the inscribing "in the air" of a certain predetermined letter, number, phrase, code or symbol.

Figure 5:
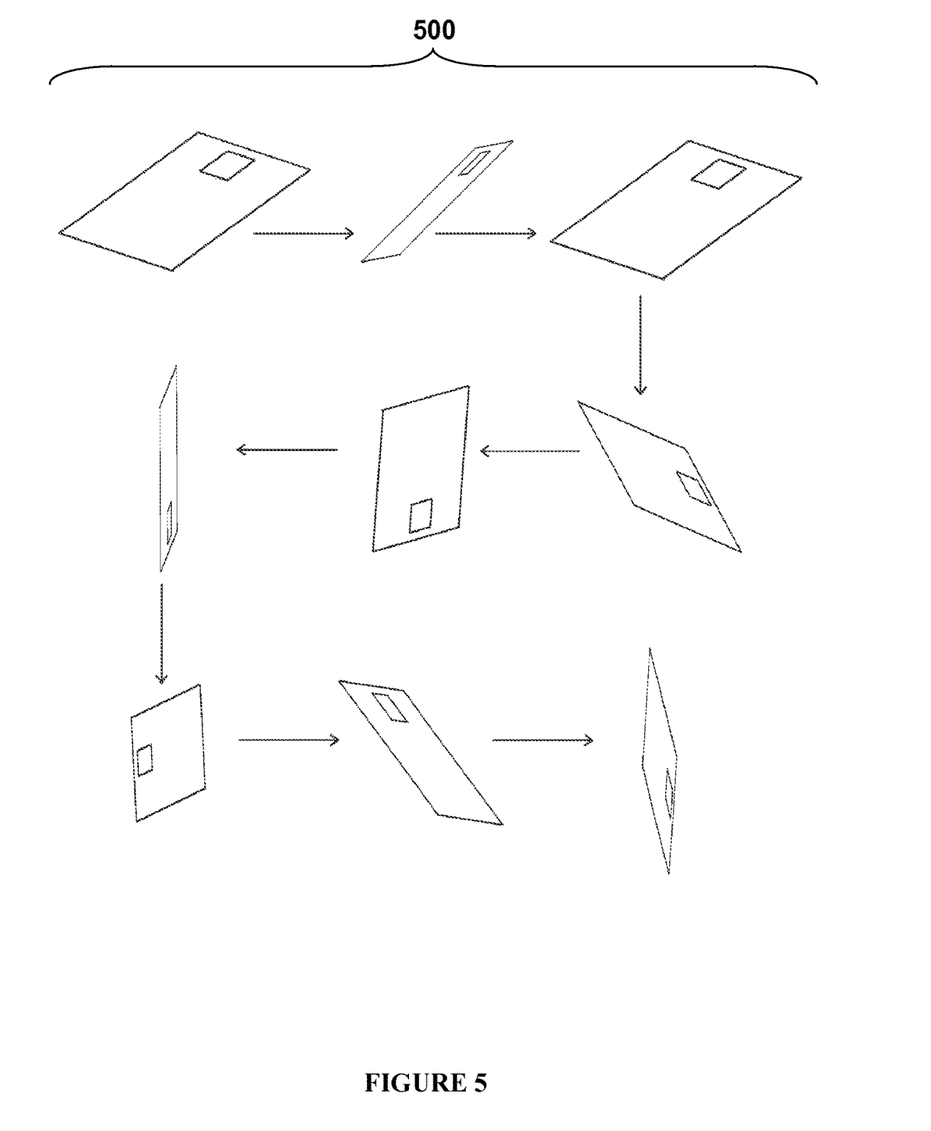
FIG. 5 illustrates an example of rotational motion or gesture, in accordance with an embodiment of the present invention.

FIG. 5 illustrates an example pattern of rotational motions 500 which may be used as part or all of the trajectory. As illustrated, the trajectory may comprise a plurality of rotations as discrete, substantially self-contained movements performed sequentially in time. Each rotation may comprise predetermined amounts of rotation about one or more of three mutually perpendicular rotation axes, in predetermined directions. Alternatively, rotations may be incorporated into a translational motion either concurrently with translation for example in a single fluid motion or alternatingly with translations.

In various embodiments, the rotations forming part of the trajectory correspond to pitch, yaw and/or roll motions of the token relative to the motion tracking module and/or scanning device. Each of the pitch, yaw and roll motions may, for convenience, be described as rotations about one of three mutually perpendicular axes which are centered at the token and optionally reorient with the token, as would be readily understood by a worker skilled in the art. For example, in the case of a rectangular credit card-shaped token, the roll axis may project perpendicularly from the face of the card, the pitch axis may be parallel to the face of the card and project perpendicularly from the shorter edge of the card, and the yaw axis may be parallel to the face of the card and project perpendicularly from the longer edge of the card. All three axes may meet at the center of the card.

In some embodiments, signal dropouts, in which the motion tracking module temporarily loses track of the fiducial markers, may be incorporated into the trajectory. These may be initiated by temporarily blocking or obscuring the fiducial markers, by temporarily guiding the token out of the field of view of the motion tracking module, or by rotating the token so that the face carrying the fiducial marker is not discernible to the motion tracking module.

In some embodiments, tapping of the token or even of a user's finger on the motion tracking module, for example in a predetermined rhythmic pattern, may be incorporated into the trajectory. Tapping patterns may comprise substantially all of the trajectory or taps may be interspersed with other trajectory actions. In some embodiments, the detection module comprises an accelerometer, piezoelectric or piezoresistive sensor, capacitive touch sensor, touchscreen, tactile sensor, strain gauge, physical button, or the like, configured to register such taps and/or patterns of taps input in time. It is noted that, in one embodiment, if the required gesture consists entirely of taps, the fiducial marker may be omitted or unused.

In some embodiments, the motion tracking module or alternatively the detection module is configured to monitor changes in the electromagnetic field which is typically being generated for detection of an RFID within the token. The changes in the electromagnetic field can be considered changes in strength, distortions of the electromagnetic field or other detectable changes to an electromagnetic field that would be readily understood by a worker skilled in the art. In these embodiments, the fiducial marker comprises a loop antenna or other device, wherein this loop antenna or other device is configured to manipulate the electromagnetic field generated by the detection module. As the token is rotated within an electromagnetic field generated and monitored by the motion tracking module or alternatively the detection module, the antenna may manipulate said field thereby indicating the trajectory which may correspond to a pattern of rotations of the token. For example, the pattern of rotations may be interpreted as a binary signal. In addition, in some embodiments, the tracking of changes in the electromagnetic field can further provide for the tracking of accelerations, deccelerations and positional data of the token, which can be further used for the evaluation of a tapping motion onto the token scanning device itself. In some embodiments, this tracking of changes in the electromagnetic field by the motion tracking module or alternatively the detection module can be performed instead of optical detection or in conjunction with optical detection, thereby providing further details relating to the tracking of movement of the token.

In various embodiments, the detection module of the contactless system is configured to trigger operation of the motion tracking module to begin attempts to track the trajectory of the token. Upon the detection module detecting presence of the token, the detection module is configured to transmit a signal to the motion tracking module which causes the motion tracking module to begin its tracking attempts. This facilitates substantially automatic acquisition of the token trajectory, substantially concurrently with its presentation to the token scanning device. This also facilitates power saving since the motion tracking module may be configured to power down until triggered.

In some embodiments, the user may signify termination of the tracked motion by a predetermined movement, such as holding the token still for one second, or removing the token from the motion tracking module's field of view. In some embodiments, the motion tracking module may terminate tracking and/or the authentication module may signal successful authentication upon successfully observing an adequately adequate replica of the reference trajectory or expiry of a given time interval, whichever occurs first.

Authentication Module

As set forth above, embodiments of the present technology comprise an authentication module configured to authenticate the token if the tracked input trajectory matches sufficiently to a reference trajectory associated with the obtained data. For example, the authentication module may authenticate the token for a transaction based on matching the tracked input trajectory to a reference trajectory in a comparable manner to how a chip-and-pin card such as a credit card is authenticated based on whether a user-supplied PIN matches a stored value of the PIN. The authentication module is configured to receive and process the input trajectory in an attempt to correlate it with the reference trajectory, in conjunction with other information retrieved from the token via the contactless system.

As it may generally be impractical for a user to precisely and consistently reproduce the reference trajectory, the authentication module may be configured to authenticate the input trajectory if it matches the reference trajectory within a predetermined margin of error and/or when subjected to limited amounts of spatial and/or temporal deformation. In some embodiments, the authentication module may be configured to authenticate an input trajectory regardless of trajectory starting point, trajectory direction, or the like. In some embodiments, the authentication module may be configured to authenticate an input trajectory even if some aspects thereof do not precisely match corresponding aspects of the reference trajectory. Thus, authentication may be tolerant (within a predetermined amount of error) to aspects of the input trajectory such as: scaling of the input trajectory in one or more dimensions of space and/or in time, limited pauses in the input trajectory, temporary accelerations and/or decelerations of the input trajectory, a limited number of jumps or glitches in the input trajectory, a limited number of unintentional signal dropouts, or the like, or a combination thereof. In some embodiments, the input trajectory may be authenticated if it falls inside one or more "envelopes" of acceptable trajectories, such as spatial, angular or temporal envelopes. In some embodiments, various pattern recognition routines may be used to determine if the input trajectory contains an adequate representation of the reference trajectory. In some embodiments, if the input trajectory is executed more quickly than an upper limit or more slowly than a lower limit, the input may be rejected.

In some embodiments, a customized "distance" metric may be used to determine distance between the input trajectory and the reference trajectory, and the input trajectory may be authenticated if the distance metric is less than a predetermined value. In some embodiments, the distance metric may apply to the trajectory, its first or higher derivative, or the like, or a combination thereof.

In some embodiments, a history of prior input trajectories provided by a user may be used to establish adequacy parameters for authenticating an input trajectory. For example, if a given user shows skill at consistently accurately reproducing a first set of aspects of the reference trajectory but is unable to consistently accurately reproduce other aspects, the authentication process may impose more stringent requirements for the first set of aspects. The authentication process may thus be personalized to an individual user over time.

In some embodiments, the authentication module retrieves the reference trajectory from a database based on an identifier which is retrieved from the token through communication via the contactless system. The identifier may be a bank account number, serial number, name, or other value stored on the token and substantially uniquely identifying same. The identifier and the reference trajectory may be stored in a secure remote database, the reference trajectory retrievable from the database by an authorized query specifying the identifier. The database may be remote to the authentication module, for example accessible by a bank server. The authentication module may be communicatively coupled to the database via a secure, encrypted data connection.

In some embodiments, the reference trajectory is stored on the token itself and the authentication module retrieves the reference trajectory through communication via the contactless system. This may be the case for example when the token is a stored value card which is not linked to an external account, or another self-contained identifier which may not be explicitly registered to a particular account or user. In such embodiments, the reference trajectory stored on the card may be encrypted or otherwise stored in a relatively secure manner such that an unauthorized person cannot easily retrieve the reference trajectory in order to duplicate same. However, it is recognized that if such a person is able to retrieve the reference trajectory from the card and reproduce same, the security feature as described herein may be considered to have been breached.

It is further noted that various approaches for securely associating a PIN with a stored value card may be adapted for securely associating a reference trajectory with a stored value card.

In some embodiments, in addition to having a reference trajectory associated with a token, a duress trajectory is also associated with the same token. A duress trajectory can be configured in one or more of the manners described herein with respect to a reference trajectory, wherein a duress trajectory can be a further mode of protection or personal security for the user of the token. For example, should the user of the token be in a position under which the use of the token is being coerced or forced upon the user, the user can move the token according to the duress trajectory associated therewith. In this manner, the use of the token would not be authorized and optionally discontinued. Furthermore, upon the input of the duress trajectory authorities or security personnel can be contacted in order to assist the user. The authentication module can have integrated therein a listing of one or more authorities and/or security personnel to contact in case of the input of a duress trajectory. It would be readily understood that the actions taken by the authentication module upon detection and confirmation of a duress trajectory, can be consistent regardless of the token in question.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

What is claimed is:

1. A method for gesture-based security associated with a token of a contactless system, comprising:
   contactlessly interacting with said token to detect presence of an information storage module included in said token and to scan the information storage module to obtain data therefrom;
   tracking a trajectory of positions and orientations a fiducial marker of said token, said trajectory being relative to the motion tracking module, wherein orientations represent angular orientations about axes perpendicular to a plane of the fiducial marker; and
   authenticating said token if the tracked trajectory matches sufficiently to a reference trajectory associated with the token.

2. A contactless system for gesture-based security, the system comprising:
   a token including:
      an information storage module; and
      a fiducial marker on the token, the fiducial marker configured for recognition by a motion tracking module remote to the token; and
   a token scanning device including:
      a detection module configured for contactless interaction with the token to detect presence of the information storage module and to scan the information storage module to obtain data therefrom;
      a motion tracking module configured to track a trajectory of positions and orientations of the fiducial marker relative to the scanning device, wherein orientations represent angular orientations about axes perpendicular to a plane of the fiducial marker; and
      an authentication module operatively coupled to the detection module and the motion tracking module, the authentication module configured to authenticate the token if the tracked trajectory matches sufficiently to a reference trajectory associated with the token.

3. The system according to claim 2, wherein the information storage module and the detection module correspond to complementary components of a contactless payment system.

4. The system according to claim 2, wherein the information storage module comprises an RFID tag or a contactless smart card and the detection module comprises a corresponding RFID tag reader or a contactless smart card reader.

5. The system according to claim 2, wherein at least part of the obtained data is directly descriptive of the reference trajectory.

6. The system according to claim 2, wherein the obtained data comprises an identifier of the token, the system further comprising a database having a stored association between the identifier of the token and the reference trajectory.

7. The system according to claim 2, wherein the detection module is configured to trigger operation of the motion tracking module to track the trajectory upon detecting presence of the token by the detection module.

8. The system according to claim 2, wherein the trajectory of the fiducial marker comprises spatial translation of the fiducial marker.

9. The system according to claim 2, wherein the trajectory of the fiducial marker comprises rotation of the fiducial marker in one or more of yaw, pitch and roll.

10. The system according to claim 2, wherein the trajectory of the fiducial marker comprises spatial translation of the fiducial marker in up to three dimensions and rotation of the fiducial marker in one or more of yaw, pitch and roll.

11. The system according to claim 2, wherein the motion tracking module comprises an optical transducer configured to track the fiducial marker.

12. The system according to claim 2, wherein the fiducial marker is substantially unique, optically recognizable and has a predetermined size known to the motion tracking module.

13. The system according to claim 2, wherein the fiducial marker comprises two or more elements disposed near opposing edges of a surface of the token.

14. The system according to claim 2, wherein a shape of the fiducial marker is substantially asymmetric under rotations about an axis perpendicular to a surface of the token on which the fiducial marker is formed.

15. The system according to claim 2, wherein the fiducial marker and the information storage module are at least partially integrated.

16. The system according to claim 2, wherein the motion tracking module is configured to track rotation of the fiducial marker at least in part by tracking distortion of the fiducial marker.

17. The system according to claim 2, wherein the authentication module is configured to signify authentication automatically upon determining that the tracked trajectory matches sufficiently to the reference trajectory.

18. The system according to claim 2, wherein the motion tracking module is further configured to track changes in an electromagnetic field, said changes resulting from movement of the token proximate to the token scanning device.

19. A device for use in scanning a token associated with a contactless system, the device comprising:
   a detection module configured for contactless interaction with said token to detect presence of an information storage module included in said token and to scan the information storage module to obtain data therefrom;
   a motion tracking module configured to track a trajectory of positions and orientations of a fiducial marker of said token, said trajectory being relative to the motion tracking module, wherein orientations represent angular orientations about axes perpendicular to a plane of the fiducial marker; and an authentication module operatively coupled to the detection module and the motion tracking module, the authentication module configured to authenticate said token if the tracked trajectory matches sufficiently to a reference trajectory associated with the token.

20. The device according to claim 19, wherein the detection module is configured to trigger operation of the motion tracking module to track the trajectory upon detecting presence of the token by the detection module.

21. The device according to claim 19, wherein the motion tracking module is configured to track rotation of the fiducial marker at least in part by tracking distortion of the fiducial marker.

22. The device according to claim 19, wherein the motion tracking module is further configured to track changes in an electromagnetic field, said changes resulting from movement of the token proximate to the token scanning device.

* * * * *